Oct. 22, 1940.                T. N. JOYCE                2,218,822
                     CONTROL SURFACE FOR AIRPLANES
                   Filed July 20, 1938        10 Sheets-Sheet 1

Inventor
TEMPLE N. JOYCE

By Semmes, Keegin & Semmes
Attorneys

Oct. 22, 1940.　　　　T. N. JOYCE　　　2,218,822
CONTROL SURFACE FOR AIRPLANES
Filed July 20, 1938　　　10 Sheets-Sheet 7

Inventor
TEMPLE N. JOYCE
By Semmes, Keegin & Semmes
Attorneys

Oct. 22, 1940.　　　　T. N. JOYCE　　　　2,218,822
CONTROL SURFACE FOR AIRPLANES
Filed July 20, 1938　　　10 Sheets-Sheet 10

Inventor
TEMPLE N. JOYCE
Semmes Keegin & Semmes
Attorneys

Patented Oct. 22, 1940

2,218,822

UNITED STATES PATENT OFFICE 2,218,822

CONTROL SURFACE FOR AIRPLANES

Temple N. Joyce, Arnold, Md., assignor to Zap Development Corporation, Baltimore, Md., a corporation of Delaware Application July 20, 1938, Serial No. 220,359

20 Claims. (Cl. 244—42)

The present invention relates in general to aircraft and more particularly has reference to control surfaces for airplanes.

Heretofore it has been found to be highly advantageous to employ airfoils in which the ratio of maximum lift to minimum drag that could be obtained was relatively large. In present day design, flaps are being used to increase that ratio of an airfoil by increasing the maximum lift obtainable without increasing the minimum drag any appreciable amount. In addition, airfoils of variable camber and variable area are resorted to in an effort to secure an increase in this ratio. However, the majority of the constructions mentioned above possess undesirable characteristics, for instance, the structural details are of such complex nature and the cost of manufacture is so high as to render their use prohibitive. In addition, the lift increasing members or flaps conflict with the lateral control members or ailerons and as a result, hinder the efficiency of either or of both members.

An object of the present invention is to overcome the disadvantages now inherent in the art.

Another object of the present invention is to arrange the parts in such a manner that they will not impede or hinder the effectiveness of the controlling elements or the proper balance.

Still another object of the present invention is to provide means for increasing the efficiency of aircraft lifting surfaces and of its lateral control surfaces.

Another object of my invention is to provide an airfoil which will have proper lateral control at both low and high speeds.

Still another object of my invention is to provide an airfoil with lateral control surfaces that will enable the employment of full-span flaps thereby allowing minimum take-off distance and maximum reduction in landing speed.

Yet another object of my invention is to provide a spoiler, flap and aileron control in which the aileron cannot be operated as long as the flap is in its inoperative position.

Yet a further object of this invention is the provision of control surfaces for airfoils which are relatively simple in construction and operation and which can be easily and cheaply manufactured.

To achieve the above and other important objects, the present invention embraces the provision of an airfoil having spoiler, flap and aileron surfaces. The above surfaces are so associated with each other that when the airplane is flying at high speed, the flap and aileron are in their inoperative positions and it is impossible to move the aileron to its operative location so long as the flap is in its inoperative position. At the same time, however, the spoilers are free to be operated at high speeds to afford the necessary lateral control for the airplane. Manifestly, this arrangement by preventing the ailerons from being moved to their operative positions while the plane is flying at high speeds, will obviate any possibility of these members being ripped off or damaged in any way, or affected adversely by ice.

On the other hand, when the airplane is flying at low speed and the flap is lowered, the aileron will then be moved to its operative position. At the same time, the spoilers are disengaged from the control and are moved to their inoperative position. The type aileron used in this invention is highly effective at low speeds due to the fact that it is lying in a stimulated flow of air over the top surface of the air foil caused by the lowering of the flap and as a result any movement of the ailerons has an increased effect on the lateral movement of the wing.

Of course, the present invention possesses additional advantageous characteristics and has additional objects that will become readily apparent from a study of the embodiments of the inventive concept illustrated herein.

To facilitate an adequate comprehension of my invention, reference is directed to the accompanying drawings which illustrate various forms of the present invention, it being understood, however, that various changes may be made therein by those conversant in the art without exceeding the scope of the invention as described by the appended claims.

In the drawings in which like numerals designate similar parts.

Figure 1:
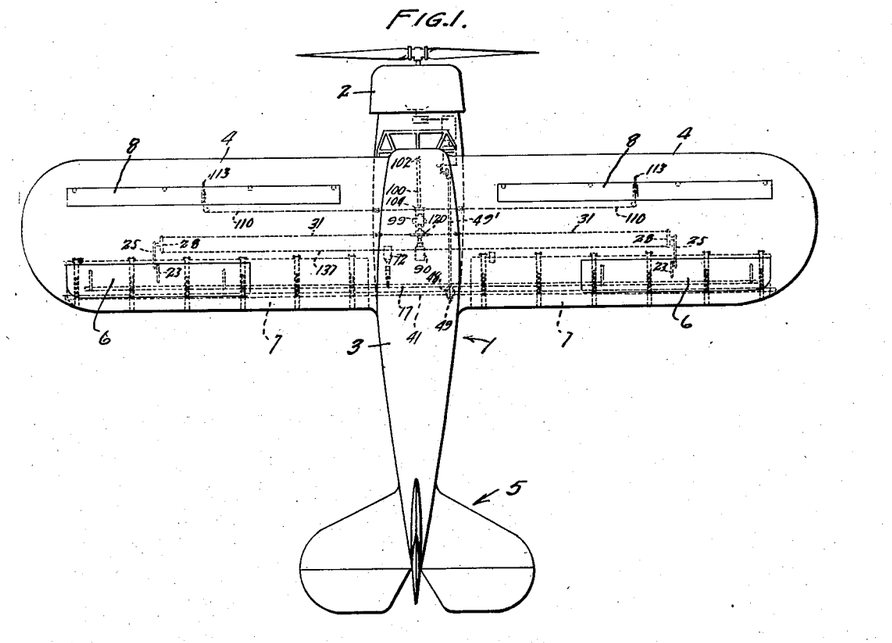
Figure 1 is a top plan view of an airplane equipped with my spoiler, flap and aileron constructions.
Figure 2:
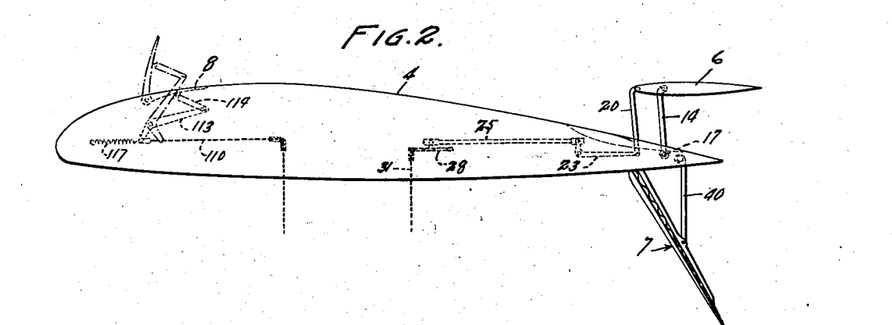
Figure 2 is a side elevational view of an airfoil showing the flap and aileron in the operative position.

Referring to the drawings and more particularly to Figure 1, there is depicted an airplane 1 having a motor 2, fuselage 3, airfoils 4, and an empennage assembly 5. As best shown in Figure 2, ailerons 6 are mounted above the airfoil at the trailing edge and flaps 7 are supported below the airfoil near the trailing edge thereof. In addition, spoilers 8 are provided adjacent the leading edge of the airfoil. Of course, it is obvious that the spoilers can be located at other advantageous locations on the upper surface of the wing 4.

Figures 3, 4:
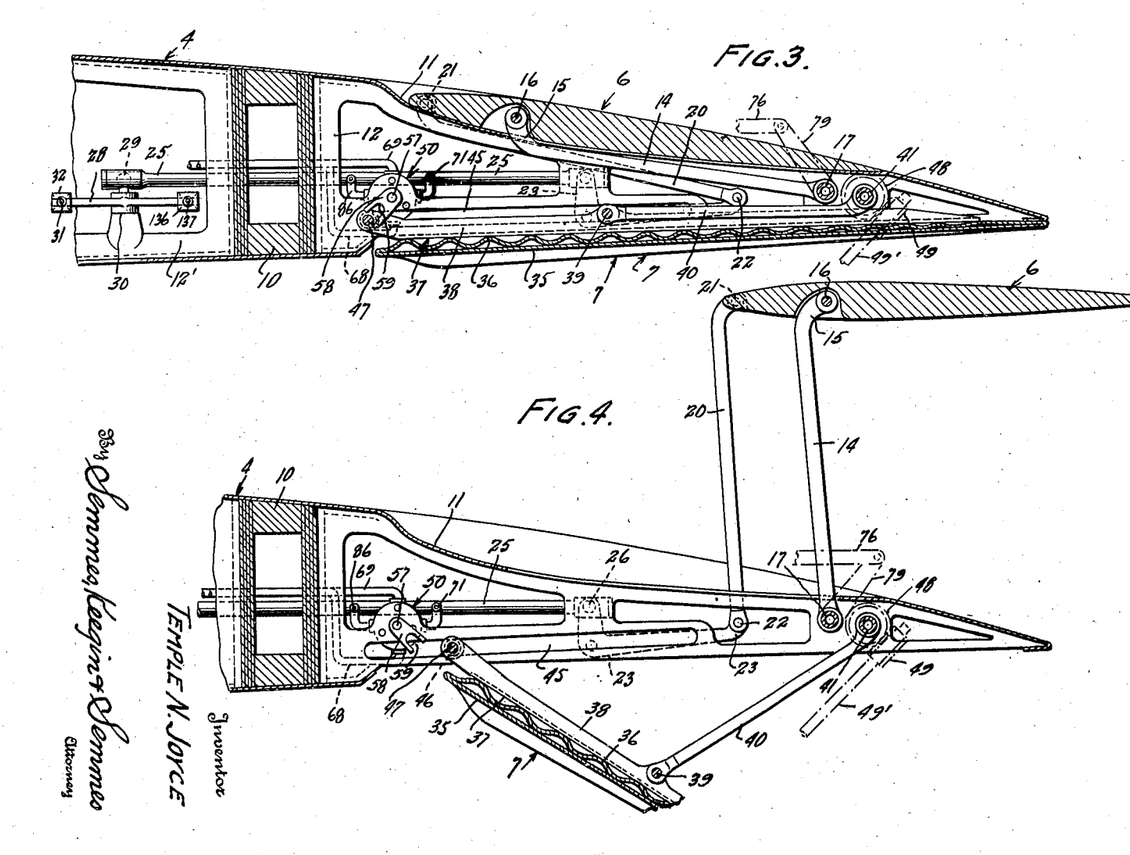
Figure 3 is a fragmental sectional view of the trailing edge of an airfoil showing the aileron and flap in their raised position.
Figure 4 is a fragmental sectional view of an airfoil showing the aileron and flap in their operative position.

Each wing is provided with a rear spar 10 and a recess 11 is formed in the upper trailing edge thereof in which the aileron 6 is adapted to nest in its inoperative position as shown in Figure 3. Also, the trailing edge of the airfoil 4 is provided with conventional longitudinal bracing members 12 that are attached to the spar 10 as shown at 13.

The main portion of the wing likewise is provided with similar bracing members 12'. The aileron 6 is mounted on a link or arm 14, the upper end of which is slightly curved as shown at 15 and is affixed to a transversely extending tube 16 suitably journalled in the aileron 6. The lower end of the link 14 is attached to a torque tube 17 that extends laterally of the airfoil and is supported in the braces 12 as shown at 18.

A second link 20 which is substantially parallel to the link 14 is pivoted at its upper end to the leading edge of the aileron 6 as depicted at 21. As will hereinafter become more readily apparent, the link 20 is adapted to actuate the aileron, whereas, the link 14 is employed to move the aileron from its nested location up to its position in the airstream.

The lower end of the link 20 is pivoted at 22 to a bell crank 23 which in turn is pivotally attached to a push rod 25 as shown at 26. The push rod 25 extends through apertures 27 in the spar 10 into the main area of the wing and is pivotally connected to an operating arm 28 as depicted at 29. In addition, the arm 28 is suitably pivoted to a portion of the wing as shown at 30. The aileron operating cables 31 are secured to the arm by connections 32.

The above arrangement was described in connection with the right aileron, but it is, of course, obvious that the left aileron is of similar construction.

The flap 7 is preferably made of sheet metal and comprises a smooth lower surface 35 and a corrugated upper surface 36. On the corrugated upper surface 36, there are provided supports 37, which are suitably attached thereto.

The supports 37 are formed with upwardly extending flanges 38 in which is journalled a stub shaft 39. Suitably secured to the stub shaft 39 is a link 40. The link 40 is attached at its upper end to a torque tube 41 as shown at 42 which extends transversely of the airfoil 4 and is suitably journalled in the bracing members 12, as shown at 43.

Figure 5:
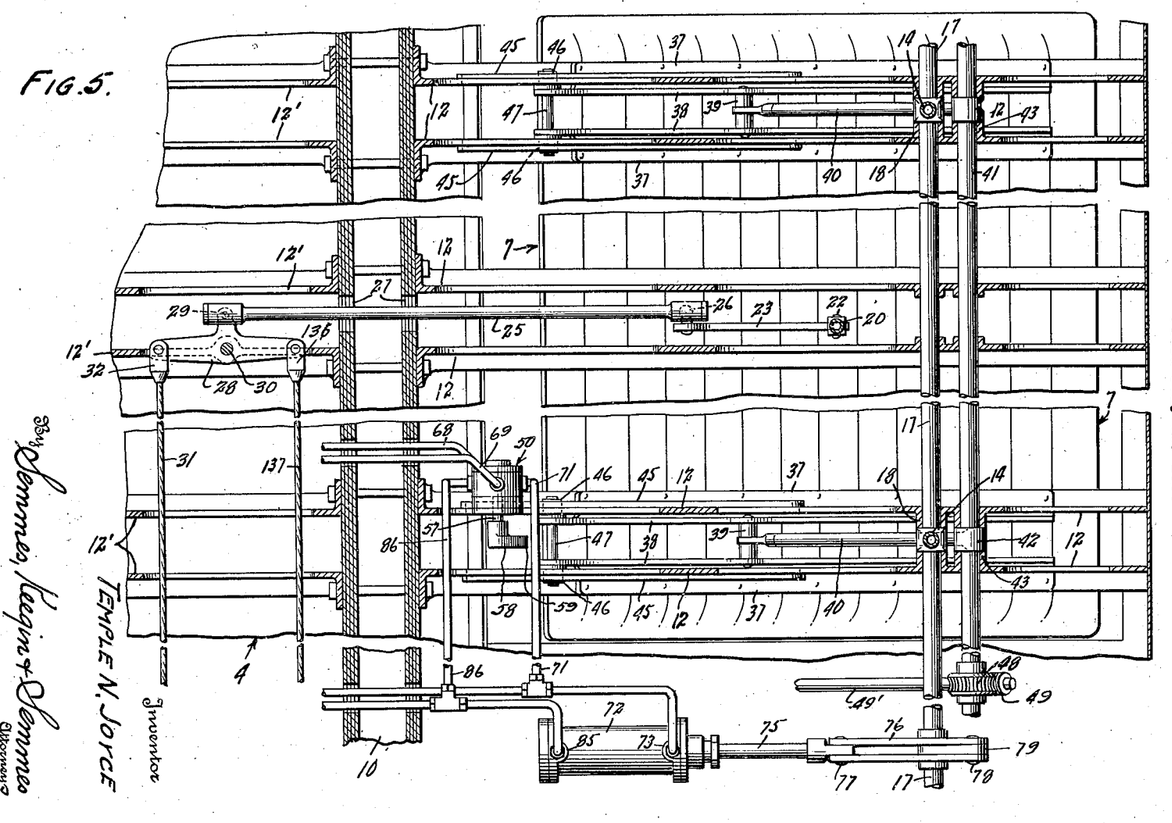
Figure 5 is a sectional view taken along the line 5—5 of Figure 4 looking in the direction of the arrows.

As best shown in Figures 4 and 5, a pair of the longitudinally extending bracing members 12 are provided with elongated slots 45 which are inclined slightly from the horizontal as shown in Figure 4. Rollers 46 mounted on a shaft 47 in the flanges 38 of the flap 7 are adapted to ride in the slots 45. In order to move the flap 7 from its raised or inoperative position as shown in Figure 3, to its extended or operative position as shown in Figure 4, I have provided the following construction.

Referring to Figure 5, it can be seen that the torque tube 41 is provided with a worm 48 which is adapted to mesh with a worm wheel 49 mounted on a shaft 49'. The shaft 49' extends to a location near the pilot's seat, so that by rotation of a handle or the like associated with the shaft, the shaft can be rotated to move the flap.

As previously pointed out, the aileron 6 cannot be operated as long as the flap 7 is in its raised or inoperative position. However, when the flap is lowered, the aileron can be operated. It is obvious therefore that it is necessary to provide some means that will move the aileron to a point above the airfoil when the flap 7 is lowered from its raised position.

In order to accomplish this result, I have provided a valve construction that is designated generally by the numeral 50 and which is located in the trailing edge of the airfoil 4 at a position adjacent the leading edge of the flap as shown in Figure 3. The valve 50 is of the four-way type and is provided with ports 52, 53, 54 and 55. The valve 50 has a plug 56 which is mounted on a spindle 57. An arm 58 having a bifurcated end 59 is secured to the outer end of the arm 57 and as shown in Figure 5, the arm 58 is located in the path of the shaft 47.

Figure 6:
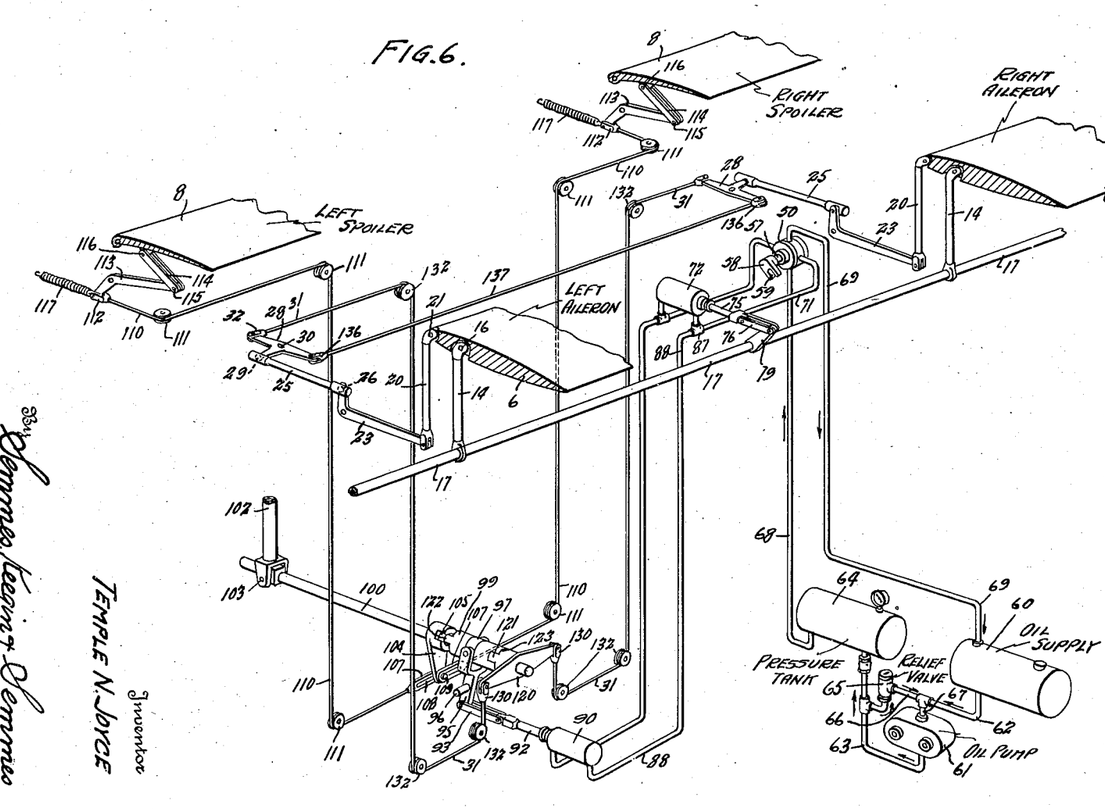
Figure 6 is a diagrammatic representation of the control mechanism for actuating the ailerons and spoilers.

In Figure 6, I have shown diagrammatically the manner in which the ailerons and flap are operated. It can be seen that there is provided at some suitable location in the airplane a source of oil designated 60. The oil supply 60 is connected with an oil pump 61 by means of piping 62. Pipe 63 connects the oil pump 61 with a pressure tank 64. Suitably coupled to the line 63 is a relief valve 65 which is also provided with a line 66 which communicates with the pump 61 through connections 67.

In the event the oil pump 61 fails, it is possible by means of the pressure tank 64 to always have a source of oil under pressure thereby obviating any danger of the oil supply system being rendered inoperative.

The pressure tank 64 is provided with a lead pipe 68 which communicates with the port 52 in the valve 50. The port 54 is provided with line 69 which is attached at its other end to the oil supply source 60.

Figures 7, 8:
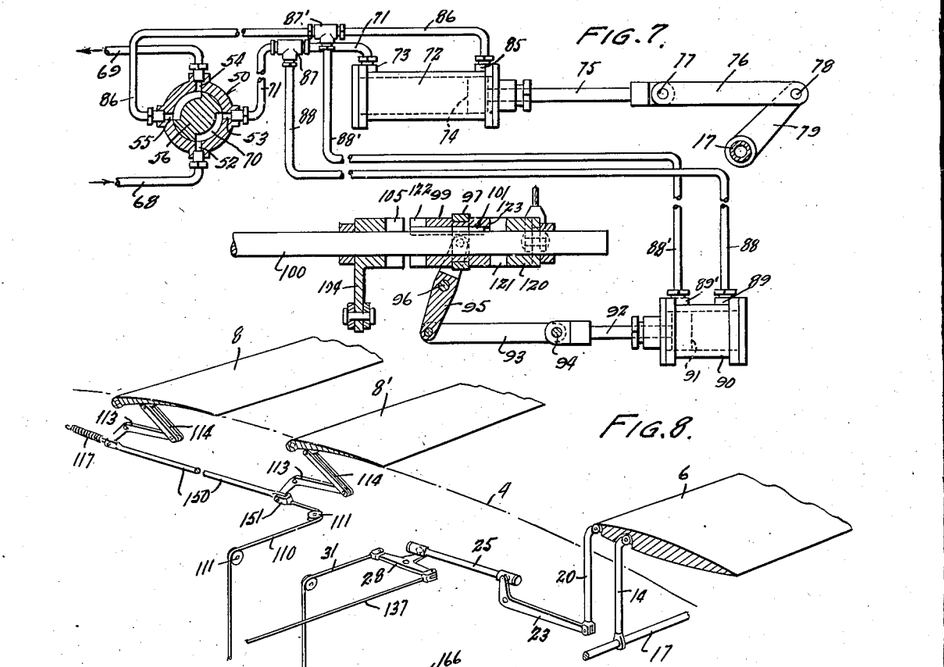
Figure 7 is a diagrammatic representation of the valve mechanism for actuating the aileron raising member and for operating the clutch mechanism that is associated with the control stick.
Figure 8 is a diagrammatic representation showing the use of two hinged spoilers.

Assuming, for the sake of explanation, that the flap 7 is being lowered as shown in Figure 4 and the valve is in the position indicated in Figure 7, it can be seen that the oil under pressure is admitted through port 52, thence into the orifice 70, in the plug 56 and out through the outlet 53 into pipe 71. The oil flows through pipe 71 into a cylinder 72 through inlet 73. A piston 74 carried by piston rod 75 is movable in the cylinder 72. Manifestly, when the oil is admitted into the cylinder 72, the piston 74 will be moved toward the right as shown in Figure 7. A link 76 is pivotally attached to the end of the piston rod 75 as shown at 77. The opposite end of the link 76 is swingably connected at 78 to an arm 79 which is rigidly attached to the torque tube 17.

It is believed apparent that when the fluid under pressure is admitted into the cylinder 72, the piston 74, link 76, and arm 79 will rotate the torque tube 17, thereby raising the aileron 6 to its raised position by the link 14.

It can also be seen from Figure 7 that the cylinder 72 is provided with an outlet opening 85 in which is fitted piping 86 which is in communication with the port 55 in the valve 50.

The pipe 71 is provided with T-fitting 87 into one arm of which is secured a pipe 88. The other extremity of the pipe 88 is attached to an inlet fitting 89 of a cylinder 90. A piston 91 carried by piston rod 92 is movable in the cylinder 90. Links 93 are pivoted to the piston rod 92 as shown at 94. The other ends of the links 93 are pivotally mounted to a yoke 95 which is pivoted to some suitable member of the airplane as shown at 96.

The yoke 95 is pivoted to a ring 97 that is mounted in a groove provided on a sliding member 99 which is keyed to shaft 100 as depicted at 101. The shaft 100 is connected with the control stick of the airplane 102 as indicated at 103.

An arm 104 idles on shaft 100 and is provided with a clutch face 105. Referring to Figure 6, it can be seen that a connection 107 having a lost motion slot 108 is attached to the arm 104 by the pin 109. A cable 110 is attached to the connection 107 and is guided over pulleys 111 and is provided at its opposite end with a connection 112. A bell crank 113 is pivoted at one end to the connection 112 and links 114 are pivoted to the opposite end as shown at 115. The links 114 are pivotally mounted to the spoiler 8 as shown at 116. A coil spring 117 has one end attached to the connection 112 and the opposite end suitably secured to the inside of the airfoil. The spring 117 is adapted to normally hold the spoiler 8 in its inoperative or nested position.

Referring again to Figure 7, it can be seen that a second arm 120 also idles on the shaft 100. This arm is also formed with a clutch face 121. The clutch face 105 of the arm 104 and the face 121 of the arm 120 are adapted to engage clutch faces 122 and 123, respectively, on the sliding member 99.

Obviously, when clutch face 105 of arm 104 is in engagement with the clutch face 122 of the sliding member 99, any movement of the control stick 102 will be transmitted to the spoilers 8 through shaft 100, arm 104, connection 107, cable 110, bell crank 113 and the links 114 to afford lateral control for the airplane.

When the valve 50 is opened and oil is transmitted through the pipe 88 into the cylinder 90, it will move the piston 91 toward the left as shown in Figure 7, thus moving link 92 and rocking the yoke 95 about its pivot 96. The rocking of the yoke about its pivot will move the slidable member 99 toward the right, thereby engaging the clutch face 123 of the sliding member 99 with the face 121 of the arm 120. Simultaneously, the face 122 of the sliding member 99 will be moved out of engagement with the face 105 of the arm 104, thereby disconnecting the spoilers from the control stick. It is believed clear that when the clutch face 121 of the arm 120 is in engagement with the face of the slidable member 99, any movement of the control stick 102 will be transmitted to the arm 120.

Referring again to Figure 6, it can be seen that a connection 130 is pivoted to each extremity of the arm 120. The aileron control cable 31 is attached to the connection 130 and passes over pulleys 132 which are disposed at the necessary positions in the wings and fuselage. The opposite end of the cable 31 is attached to the arm 28 by the connection 32 as heretofore pointed out. The other end of the arm 28 is provided with a connection 136 to which is attached a cable 137 that is connected at its opposite extremity to a similar arm 28 that is provided in the other wing.

In view of the foregoing description, it is believed clear that I have provided a system of lateral control for airplanes which is highly effective under all conditions of flight. By having the aileron 6 and the flap 7 so associated that the aileron cannot be moved to its operative position until the flap is lowered, any danger of the ailerons being torn loose or seriously damaged while the airplane is flying at high speeds is overcome. However, the spoilers 8 can be effectively used at high speeds to afford lateral stability of the plane.

Due to the novel clutch mechanism employed, the pilot of the plane can easily actuate the spoilers independently of the ailerons without any danger of injury, etc. In addition, by using spoilers for lateral control at high speeds, parasitic drag is greatly reduced.

On the other hand, at low speeds when the pilot lowers the flap 7, by reason of the valve 50 and its related elements, the spoilers are disconnected from the control shaft and the aileron controls are tied in with the control and the pilot can easily actuate the ailerons. The Zap type ailerons that are employed are highly effective because they are stimulated by the flow of air over the top surface of the airfoil due to the flap. In addition, by using this type of aileron, it will permit the use of a full-span flap which will reduce the distance necessary for take-off and also greatly reduce the landing speed.

In Figure 8, there is shown a somewhat modified form of my invention. In this embodiment instead of employing a single spoiler surface, I provide two spoilers identified by the numerals 8 and 8'. To actuate the surfaces 8 and 8' simultaneously, it can be seen that the cable 110 is attached to an elongated link 150 by means of a pivotal connection 151. The linkages connecting the spoilers 8 and 8' to the control 102 and the mode of operation are identical with that shown in Figure 6 and it is not necessary to repeat the description here.

Figure 9:
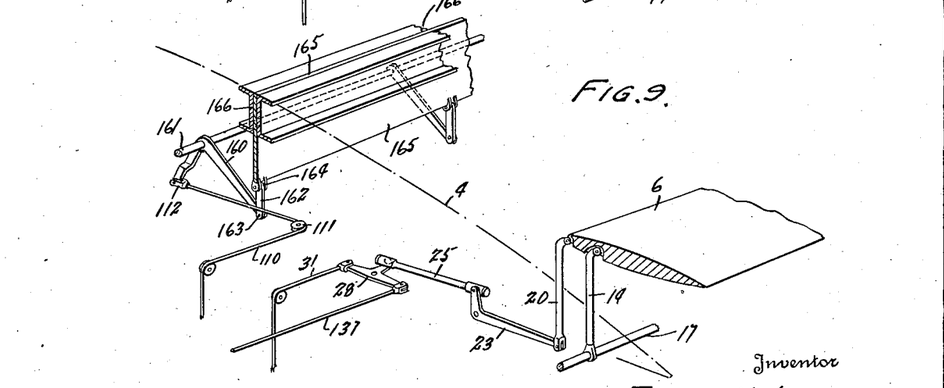
Figure 9 is a diagrammatic representation showing the use of a vertically movable spoiler.
Figures 10, 11:
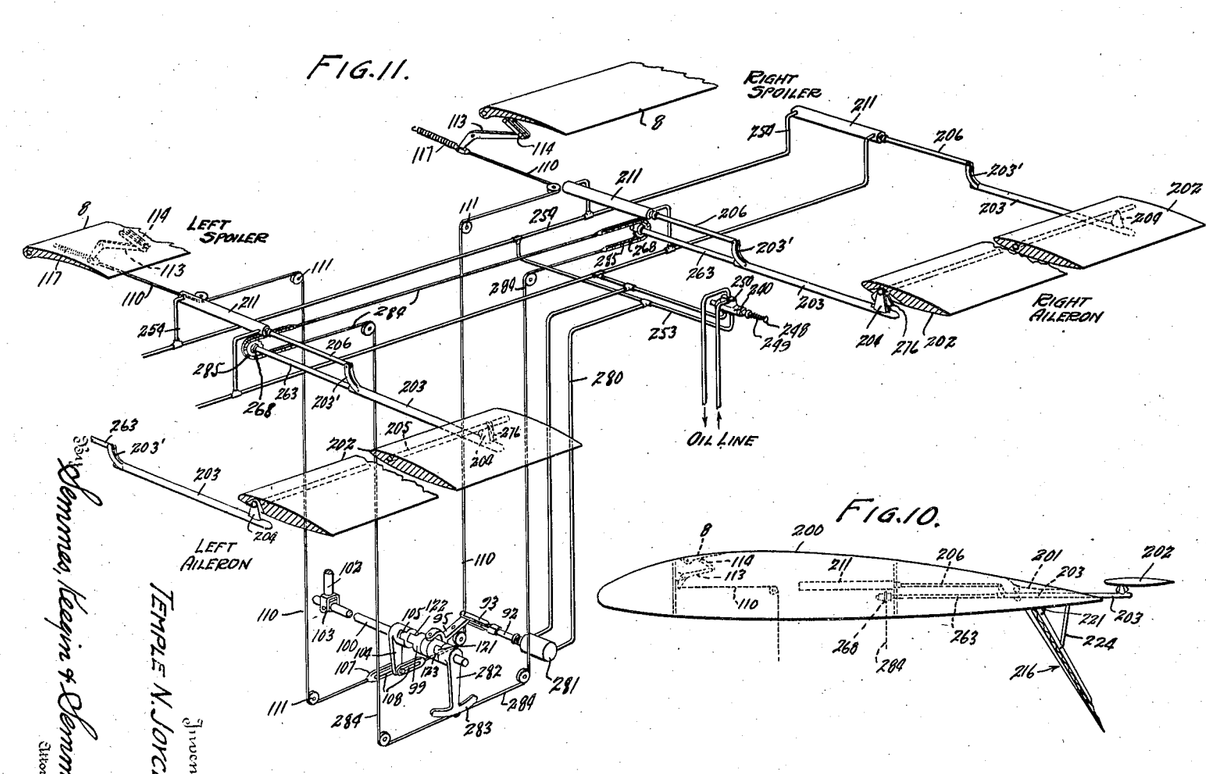
Figure 10 is a view in side elevation depicting another form of my invention and showing the aileron and flap in the operative position.
Figure 11 is a diagrammatic representation of the control system for actuating the surfaces shown in Figure 10.

In Figure 9, there is depicted another type of spoiler than can be employed in lieu of the hinged surface shown in Figures 6 and 8. In this form it can be seen that a bell crank 160 is pivotally attached to the connection 112 carried by the cable 110. The bell crank is mounted on a torque shaft 161 which extends transversely of the wing and is suitably supported therein. A link 162 is pivoted to the bell crank at one end and the opposite end of the link 162 is pivotally mounted at 164 to a vertically movable spoiler surface 165. The spoiler surface 165 is adapted to be guided upwardly through a structure 166, which forms a well for the spoiler in inoperative position.

It is believed obvious that when the pilot actuates the control stick 102, a pull will be exerted on the cable 110 which will rock the bell crank 160 about its pivot and move the spoiler surface 165 upwardly through the well 166 to spoil the airflow over the upper surface of the wing. The spoiler shown in this embodiment can be rendered inoperative in the same manner as the spoilers shown in Figures 6 and 8 when the airplane is flying at low speed and the flap is lowered.

In Figures 10 to 15 inclusive there is shown still another form of my invention. An airfoil 200 is provided with a recess 201 in the upper trailing edge and an aileron 202 is adapted to nest therein in its inoperative or retracted position. The aileron is mounted on a longitudinally slidable member 203 by means of upstanding supports 204 which are suitably secured to a tube 205 that is supported in the aileron 202. The supports 204 are preferably integrally formed with the slidable member 203, but it is, of course, obvious that these members can be united in any desired manner. The opposite end of the member 203 is provided with a goose neck 203', and a piston rod 206 is pivotally attached thereto at 207.

Figures 13, 14, 15:
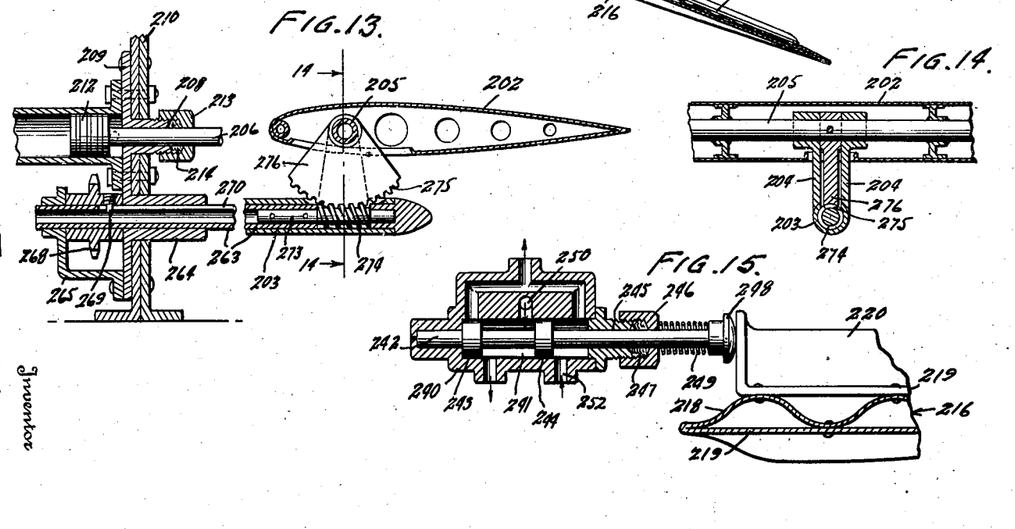
Figure 13 is a fragmental sectional view showing in detail the operating mechanism for actuating the aileron.
Figure 14 is a view taken along line 14—14 of Figure 13.
Figure 15 is a sectional view of the valve mechanism for operating the ailerons depicting the valve in the inoperative position.

As best shown in Figure 13, the rod 206 extends through a gland 208 formed on a plate 209 that is secured to a rear spar 210 of the airfoil 200. Also, bolted to the plate 209 and the rear spar 210 is a cylinder 211. It is apparent that the plate 209 forms the head for the cylinder 211. A piston 212 is adapted to move in the cylinder 211. Also, it should be noted that the gland 208 is provided with a threaded end and a screw cap 213 is enthreaded thereon. A suitable stuffing material 214 is positioned between the cap and the fitting for preventing any leakage of fluid from the cylinder 211.

Figure 12:
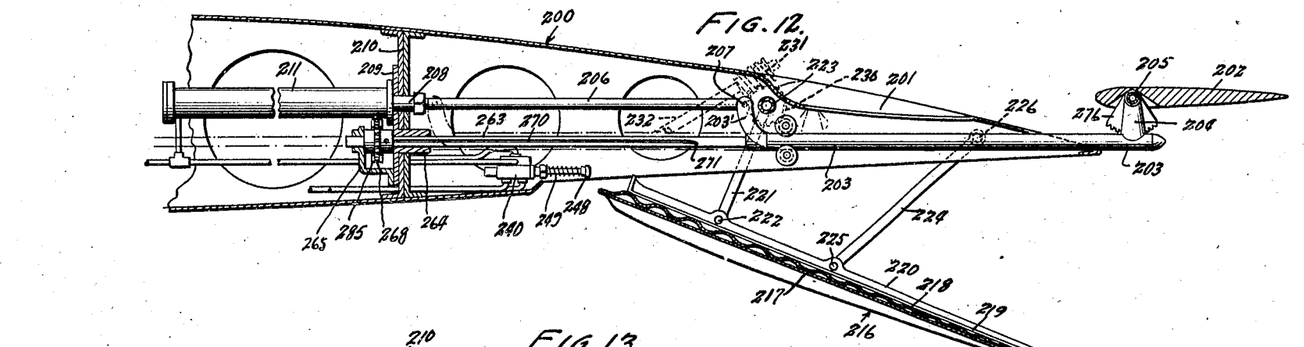
Figure 12 is a fragmental sectional view of the trailing edge of an airfoil showing the aileron and flap in the operative position.

The above described mechanism, as will later be discussed more fully, is employed to move the aileron from its recessed portion 201 into the airflow as shown in Figure 12.

Positioned below the trailing edge of the wing and adapted to form a portion of the lower surface of the airfoil 200 when in its retracted position is a flap 216.

The flap comprises a smooth lower surface 217 and a corrugated upper surface 218 to which is attached supports 219 having upwardly projecting flanges 220. Link 221 is pivoted at its lower end to the flanges 220 as shown at 222 and the upper end of the link is mounted on a torque tube 223. Positioned rearwardly of the link 221 is a second link 224 that is longer than link 221 which is pivoted at its lower end to the flap 216 as shown at 225. The upper end of the link 224 is pivoted to the airfoil at 226.

The links 221 and 224 are so positioned and are of such length that when the flap is lowered they will move downwardly and rearwardly and the trailing edge thereof will lie substantially within the locus of perpendiculars drawn to the datum lines of the airfoil sections that pass through the trailing edge of the airfoils. Also, when the flap 216 is lowered (Figure 12), there is provided a slot between the nose of the flap and the lower surface of the wing. This slot gives a balancing effect that is highly desirable and increases not only the efficiency of the flap, but is of great aid in operating the flap and moving it from the inoperative to the operative position.

As shown in Figure 12, a worm wheel 230 is attached to the torque tube 223 and a worm wheel 231 mounted on a control shaft 232 is adapted to mesh therewith. The shaft 232 is, of course, extended to a position that is convenient to the pilot of the plane. As a salient feature of the present invention is the provision of means whereby the aileron 202 cannot be moved to its operative position until the flap is lowered, I provide the following mechanism.

A valve casing 240 is suitably secured within the body of the airfoil. The valve is provided with a recessed area 241 in which is adapted to move a piston rod 242 carrying pistons 243 and 244. Into the open end of the portion 241 is fitted a connection 245 through which the piston rod 244 extends. A cap 246 is screwed onto the end of the fitting 245 and waste material 247 is positioned between the cap and the connection 245 for preventing the leakage of oil.

An operating head 248 is attached to the end of the piston rod 244 and a coil spring 249 is positioned between the head 248 and the cap 246, for holding normally the piston in the position shown in Figure 12.

Referring now to Figure 15, it can be seen that the flap 216 when it is in its upper position will bear against the head 248 of the piston rod 242 and compress the spring 249 and hold the valve in the position shown.

When the flap is lowered by the pilot, the spring 249 will urge the piston to the right as shown in Figure 12 and oil will be forced through aperture 250, portion 241, port 252 through the pipe 253, branch pipe 254, into the cylinder 211. The oil will force the piston 212 to the position indicated in Figure 13, which in turn will move the slidable tube 203 and the aileron 216 from the recess 201 into the airflow.

In Figure 13, it can be seen that a tube 263 is fitted within the slidable member 203. The rod 263 extends through a bearing surface 264 that is a portion of the plate 209. Also secured to the plate 209 is a supporting bracket 265 through which the tube 263 extends.

Mounted between the bracket 265 and the plate 209 is a sprocket wheel 268. A pin 269 extends through the hub of the sprocket and into an elongated slot 270 formed in the tube 263. In addition, the slot 270 has a downwardly extending portion 271, the purpose of which is to enable the aileron 202 to fit properly within the recess 201 when it is retracted.

Referring to Figure 13, it can be seen that a shaft 273 is fitted within the end of the tube 263. A worm gear 274 is formed on the tube 273 and meshes with teeth 275 provided on a segment 276 that is secured to the torque tube 205.

Manifestly, when rotary movement is imparted to the tube 263 through the sprocket 268, the worm gear 274 will be rotated, and as the segment 276 is in mesh therewith, movement will be imparted to the aileron 202 to afford the proper lateral control.

At the same time oil under pressure is admitted into the cylinder 211, it will flow through pipe 280 into a cylinder 281 that is similar in construction and operation to the cylinder 90 shown in Figure 6. Also, since a similar clutching mechanism is employed in connection with this modification, it is not believed necessary to go into another description thereof.

The only difference between the manner of controlling the spoilers and the ailerons in the present form is that the arm employed for actuating the ailerons is of different construction than that shown in Figure 6. It can be seen in Figure 11 that an arm 282 idles on the shaft 100 that is associated with the control stick 102. The arm 282 has an arcuate lower surface 283 provided with a groove (not shown). A control cable 284 extends through the groove and is secured to the arm in any desired manner. The cable 284 is provided with a length of chain 285 that is trained over the sprocket 268.

It is believed clear, therefore, that when the flap is lowered and the aileron 202 is removed from its recess 201, and extended to the position shown in Figure 12 that the spoilers will be disconnected from the control stick 102. At the same time, the ailerons 202 will be connected with the control due to the fact that the clutch face of the arm 282 is in engagement with the sliding member 99. Therefore, when the control stick 102 is actuated to bank the plane, movement will be imparted to the tube 263 through the cable 284, chain 285 and sprocket 268. Inasmuch as the worm 274 is keyed to the tube 263, rotary movement will likewise be imparted thereto and an oscillatory movement will be transmitted to the aileron 202 through the segment 276.

As the advantages of having the aileron and flap so associated that the aileron cannot be operated unless the flap is lowered have heretofore been adverted to, it is unnecessary to repeat them here.

In Figures 17 to 23 there is shown a wing 300 having spars 301, 302 and 303. A spoiler 304 is hinged to the wing at 305. To move the spoiler surface 304 about its pivot to spoil the airfoil over the upper surface of the wing, I employ a bell crank 306 that is pivoted at 307 to a support 308 mounted on the front spar 301. A link 309 is pivoted at one end to the bell crank 306 and at the opposite end to the undersurface of the spoiler 304. A control cable 310 that is suitably associated with the control stick is trained over pulleys 311 and is attached to the bell crank by means of a connection 312. A coil spring 313 has one end attached to the connection 312 and the other end secured in the nose of the wing 300. The spring 313 will tend to hold normally the spoiler in the position shown in Figure 17. Manifestly, when a pull is exerted on the control cable 310, the bell crank will be rocked about its pivot 307 and the spoiler 304 will be moved up into the airflow over the wing.

Figures 18, 19, 20, 21, 22, 23:
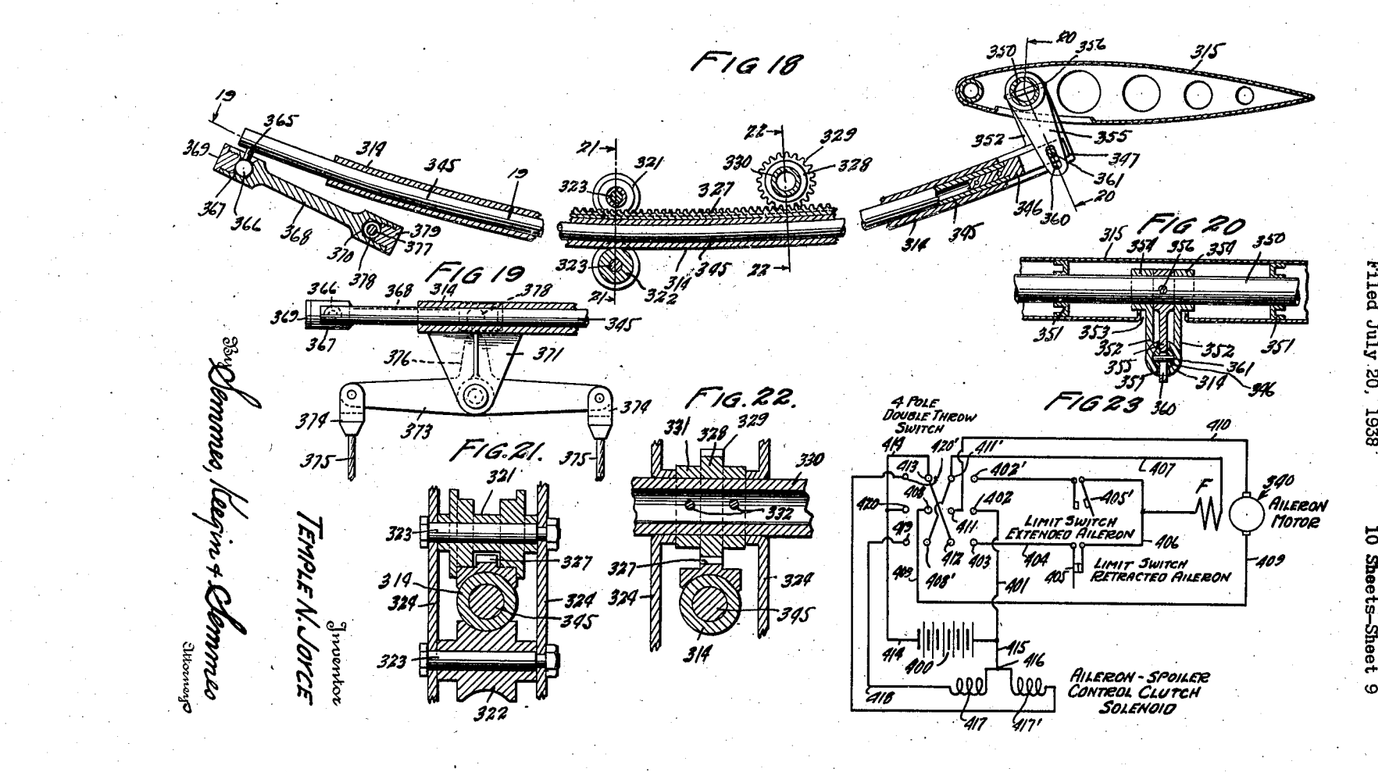
Figure 18 is a fragmental sectional view showing the manner in which the aileron is actuated.
Figure 19 is a view taken along line 19—19 of Figure 18.
Figure 20 is a view taken along line 20—20 of Figure 18.
Figure 21 is a view taken along line 21—21 of Figure 18.
Figure 22 is a view taken along line 22—22 of Figure 18.
Figure 23 is a diagrammatic representation of the electrical circuit for actuating the aileron spoiler control shown in Figures 16 to 22 inclusive.

Mounted on an arcuate supporting member 314 which is of substantially circular configuration as shown in Figure 20 is an aileron 315 that nests in a recess 316 formed in the upper trailing edge of the wing. A flap 317 similar in construction and operation to the flap shown in Figure 12 is supported beneath the rear trailing edge of the wing by means of links 318.

Figures 16, 17:
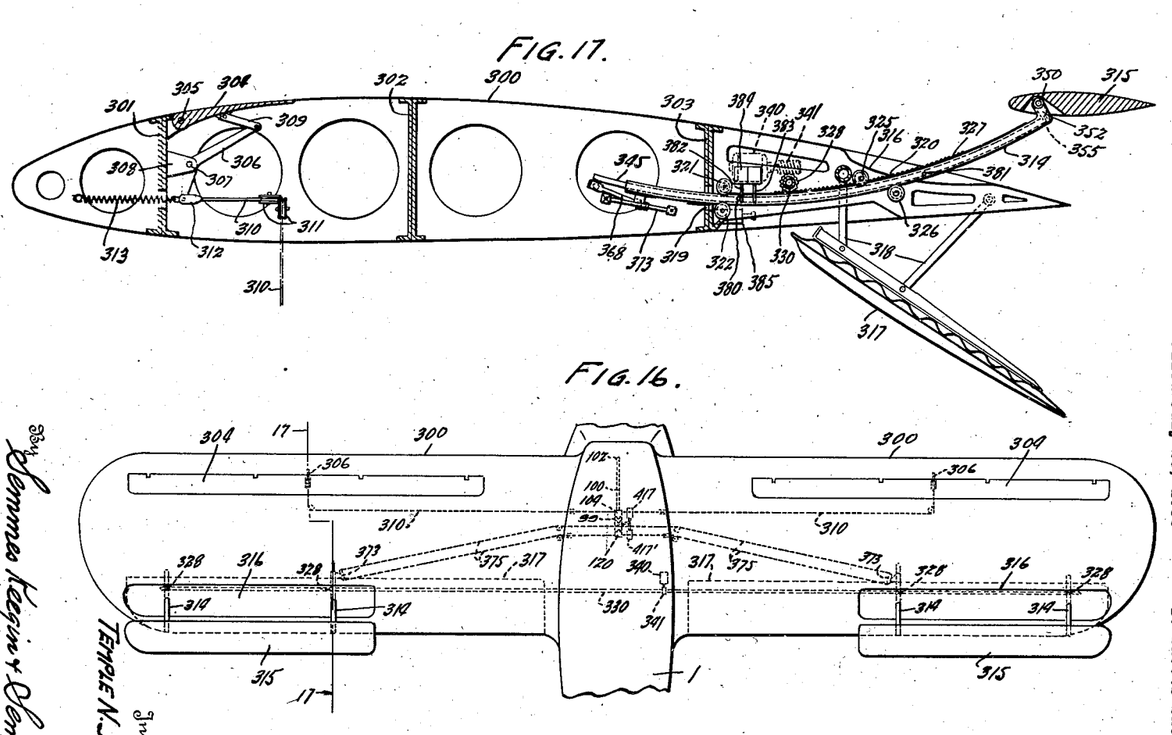
Figure 16 is a fragmental top plan view of an airplane showing another modification of my inventive concept.
Figure 17 is a view in side elevation, partly in section, of the airfoil shown in Figure 16 and depicting the aileron and flap in the operative position.

As shown in Figure 17, the movable supporting member 314 is adapted to extend through a slot 319 in the rear spar 310 and through a slot 320 provided in the nest 316. In order to support the arcuate shaped member 314, a pair of upper and lower rollers 321 and 322, respectively, are provided immediately forward of the rear spar 310. As best shown in Figure 21, the rollers are mounted on shafts 323 that are suitably journalled in longitudinal bracing members 324 provided in the trailing edge of the wing. In addition, a second pair of rollers 325 and 326 are suitably supported in the trailing edge near the nested portion 316. It can be readily seen from Figure 17 that the above mentioned rollers in effect afford a cantilever support for the movable arcuate shaped member 314. In order to move the arcuate support member 314 from its nested position to the position shown in Figure 17 where the aileron 315 is disposed in the airflow over the wing, I provide a portion of the upper surface of the member 314 with a toothed rack 327. A gear wheel 328 having teeth 329 is carried by a tube 330 which extends transversely of the wing and is supported in the longitudinal braces 324 thereof. In Figure 22, it can be observed that the gear 328 has a hub 331 which is of such size as to fit snugly between the bracing members 324 and pins 332 secure the gear 328 to the tube 330.

The teeth 329 of the gear 328 are engaged with the teeth of the rack 327. It is believed apparent, therefore, that when the gear 328 is rotated, the rack 323 will be moved.

In Figure 17, it can be seen that an electric motor 340 of the reversing type is suitably supported in the trailing portion of the wing. The motor drives a worm gear 341 that is associated with the tube 130. Obviously, when the motor drives the worm gear 341, the gear 328 will move the slidable support 314. Inasmuch as the motor 340 is of the reversible type, the movable support 314 can be moved to the position shown in Figure 17 positioning the aileron 315 above the wing or the support can be moved in the opposite direction and dispose the aileron within the nest or well 316.

It is, therefore, necessary to provide some mechanism by which the aileron 315 can be actuated through the control stick by the pilot when it is in its operative position (see Figure 17).

By reference to Figure 17, it can be seen that an arcuate tube member 345 is slidably fitted within the arcuate support member 314. An extension 346 is fitted into the open innermost end of the member 345 and is secured thereto by any desired means. It is clearly apparent from Figures 18 and 20 that the extension is provided with a bifurcated end 347, the purpose of which will later become apparent.

In Figure 20, it can be seen that the aileron 315 is provided with a supporting rod 350 that is suitably supported in bracing members 351. The aileron is supported on the slidable member 314 by means of a pair of parallel arms 352 which are secured at their lower ends to the slidable member 314. The upper ends of the arms 352 extend through a slot 353 in the lower leading edge of the aileron and are fitted around the tube 350 as shown at 354.

An operating arm 355 is positioned between the supporting arms 352 and the upper end is secured to the tube 350 by a pin 356. It can be seen from Figure 20 that the lower end of the arm 355 extends through aligned slots 357 formed in the upper and lower portions of the sliding member 314. An elongated aperture 360 is formed in the lower portion of the arm 355 through which extends a pin 361 that is carried by the bifurcated portions of the extension 346. Clearly, any arcuate movement of the tube 345 will translate an oscillatory motion to the aileron 315 by reason of the aileron's connection with the extension 346 through the arm 355.

As best shown in Figure 18, it can be seen that the end of the tube 345 is formed with a downwardly extending pin 365 which carries a ball 366 at the end thereof. The ball 366 fits in a socket 367 carried in an enlarged end of a connecting rod 368. The enlarged end is interiorly threaded and a cap 369 screws therein to hold the ball 366 in proper position. The opposite end of the connecting rod 368 is provided with an enlarged end having a socket 370. A supporting bracket 371 is suitably attached to the lower portion of the supporting member 314. Pivotally mounted to the bracket at 372 is an arm 373 to which is attached at each end by suitable connections 374, aileron operating cables 375 that in turn are affixed to the control mechanism associated with the control stick (not shown). The arm 373 is formed with a right angled extension 376 that carries a pin 377 depending therefrom. The pin is formed with a ball 378 at its lower end which fits into the socket 370. A screw cap 379 is screwed into the open end of the connecting rod 368, thereby holding the ball 377 in its proper location.

When the arm 373 is moved about its pivot 372 by a pull being exerted on the control cable 375, the connecting rod 368 will be moved either to the right or left depending, of course, upon the direction of pull on the cable. Of course, if the rod 368 is moved toward the right, the tube 345 will likewise be moved toward the right within the supporting member 314, thereby moving the aileron upwardly through the connections previously discussed. Similarly, as the pull on the control cables moves the connecting rod 368 to the left, the tube 345 will likewise be moved to the right and the aileron will be moved downwardly.

In order to disconnect the spoilers from the control stick when the flap is lowered and the aileron is moved to its operative position, I have employed an electrical circuit that is diagrammatically depicted in Figure 23. It is, of course, important to provide means that will limit the outward movement of the movable member 314 when the aileron has attained its proper position in the airflow over the wing. Also, means must be provided to limit the inward movement of the aileron supporting member 314 when the aileron has reached its inoperative position within the recess 316. By reference to Figure 17 it can be seen that the support member 314 is provided with pins 380 and 381. The pins 380 and 381 are adapted to trip the arms 382 and 383 of a limit switch 384 that is located in the trailing portion of the wing.

In addition, there is further provided a four-pole reversing switch 385 that is located at a point adjacent the leading edge of the flap 317 when the flap is in its upper or inoperative position. When the flap is moved to its nested position, the switch 385 is in the position shown in Figure 23; current will flow from battery 400 through line 401 to a pivot point 402 of the switch, to point 403 through line 404 to the limit switch 405. Current then flows from the limit switch through line 406 to the field F of the motor 340, then through line 407 to point 411', point 408', point 408, line 409 to one side of the motor 340. Current then flows from the other side of the motor through line 410 to the point 411 to point 412 through the switch to point 413 through line 414 to the other side of the battery 400.

At the same time, current flows from one side of the battery 400 through line 415 to point 416 through the spoiler control clutch solenoid 417 through line 418 to point 419 through the switch to point 420, thence to line 414 back to the other side of the battery 400. After the movable support member 314 has been moved rearwardly to its nested position, limit switch 405 is opened and the other limit switch 405' is closed, thus stopping the motor.

When it is desired to move the flap down, it is clear that the aileron must be moved out into the airflow. The motor 340 is caused to turn in the necessary direction by having switch 385 thrown to the position engaging contacts 420', 413, 411 and 402', the switch is in the position just indicated when the nose of the flap no longer contacts the switch. It will be apparent to one skilled in the art that when the switch is thrown, as above described, the spoiler clutch solenoid is deenergized and the aileron clutch solenoid is energized. Also, it will be obvious that upon completion of the aileron's support movement out into the airflow, limit switch 405' will open and limit switch 405 will close, thus completing the foregoing cycle.

In Figures 24 to 27, there is shown a wing 500 having an aileron 501 that is adapted to fit within a well 502 formed in the trailing edge of the wing when the aileron is in the inoperative position. A flap 503 similar in detail to the flap 216 carried by links 403' is positioned below the lower trailing edge of the wing.

The aileron 501 is mounted on a longitudinally movable support tube 504 that extends through apertures 505 and 506 in the rear spar 507 and the well 502 of the wing, respectively.

An extension 508 (see Figure 25) is fitted into the open end of the support tube 504. The extension 508 extends through an aperture 509 formed in the leading edge of the aileron and is pivotally connected to a supporting rod 510 of the aileron as depicted at 511. The connection 511 is of such size as to fit snugly between the aileron braces 512.

Figure 24:
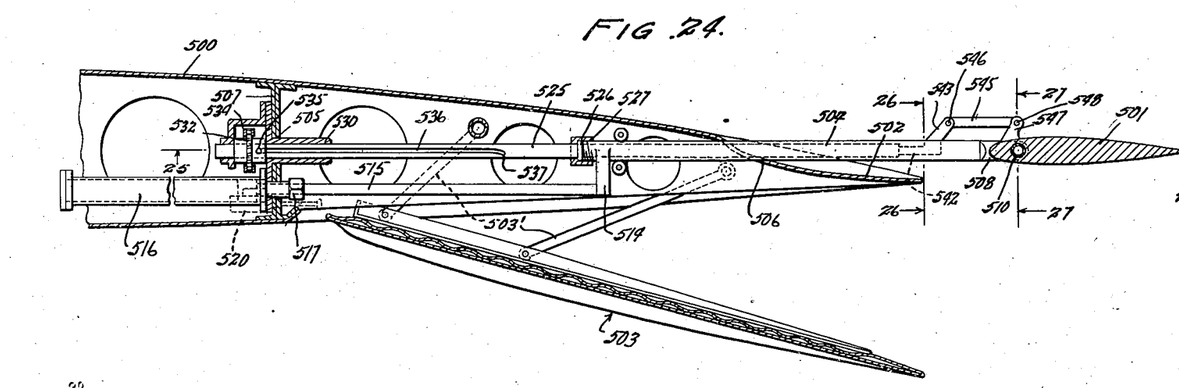
Figure 24 is a fragmental sectional view of the trailing edge of an airfoil showing another form of my inventive concept and depicting the aileron and flap in the operative position.
Figures 25, 26, 27:
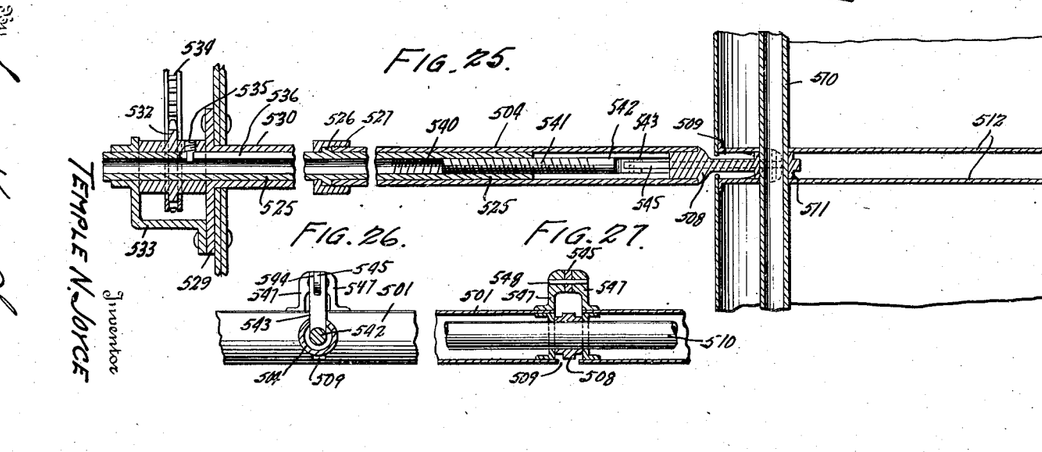
Figure 25 is a view taken along line 25—25 of Figure 24 looking in the direction of the arrows.
Figure 26 is a view taken along line 26—26 of Figure 24 looking in the direction of the arrows.
Figure 27 is a view taken along line 27—27 of Figure 24.

By reference to Figure 24, it can be noted that the support tube 504 is provided with an offset arm 514 that is preferably integrally formed therewith. The arm 514 is connected at its other end with a second rod 515. Carried at the inner end of the rod 515 is a piston (not shown) that moves in a cylinder 516 attached to the rear spar of the wing. The cylinder 516 has a gland 517 that will prevent any fluid from leaking out of the cylinder.

A valve construction 520 which can be similar in structural detail and operation to the valve 240 is disposed at a point adjacent the nose of the flap 503.

Obviously, when the flap 503 is in its up position, the piston carried by the rod 515 will be at the left end of the cylinder 516 and the support tube 504 will be within the confines of the wing and the aileron in the well 502.

However, when the flap is lowered by the pilot of the plane, the valve 520 will admit oil under pressure into the cylinder 516, forcing the piston toward the right of the cylinder (see Figure 24), simultaneously moving rod 515 and the movable support tube 504 through the aperture 505 in the well, and positioning the aileron in the airflow at the rear of the trailing edge of the wing.

To operate the aileron 501 it can be observed that a second tube 525 of smaller diameter than the tube 504 is slidably fitted into the end of the tube 504. The tube 525 has a flanged portion 526 that abuts the end of the tube 504, and a flanged cap is threaded onto the end of the rod 504 to hold the tube 525 firmly with respect to the tube 504.

A plate 529 having a hollow horizontally extending portion 530 is fixed to the rear spar of the wing and the tube 525 extends therethrough. A sprocket 532 is suitably secured to the tube 525 and a bracket 533 attached to the plate 529 holds the sprocket in proper position.

A length of chain 534 that is positioned in the control cables of the plane (see Figure 11) is trained over the sprocket 532 so that when a pull is exerted on the control cables by the pilot the sprocket will be rotated. A pin 535 extends through the hub of the sprocket and into an elongated aperture 536 provided in the tube 525. In Figure 24 it is shown that the aperture 536 has a downwardly extending portion 537 at its end which will permit the aileron 501 to nest properly within the well 502 when it is in its innermost position.

The inner end of the tube 525 is provided with internal screw threads 540, and a screw-threaded shank 541 of an operating member 542 is adapted to be screwed into the threads 540. The member 542 carries an upwardly extending arm 543 having a bifurcated end 544. A link 545 is pivoted in the bifurcated end, as shown at 546, and the opposite end thereof is attached to a pair of upwardly projecting supporting arms 547 secured to the leading edge of the aileron 501 by a pin 548.

It is believed clear that, when the tube 525 is rotated by the chain 534 and the sprocket 532, the threaded shank 541 will either be screwed further into or out of the threaded portion 540 depending of course upon the direction of rotation of the tube 525. For the purpose of clarity let us assume that the shank 541 has been screwed further into the tube 525, then the link 545 will be pulled rearwardly and the aileron moved upwardly. Inasmuch as the aileron 501 and the spoiler (not shown) are adapted to be engaged and disengaged from the control stick in the same manner and by a similar construction as that shown in Figures 6 and 11, it is not necessary to describe again this mechanism.

It will be appreciated from the foregoing that there are provided control surfaces for an airplane that will enable the employment of full-span flaps permitting minimum take-off distance and maximum reduction in landing speed. Moreover, by the association of the spoiler, flap and aileron control, there is afforded proper lateral control for airplanes at both low and high speeds. In addition, by preventing the use of the aileron as long as the flap is in its inoperative position, there can be no danger of the aileron being ripped off or damaged while the plane is flying, for example, at high speeds.

While I have shown several preferred embodiments of my inventive concept, it is, of course, to be understood that I am not to be limited to the precise structures set forth, but that the scope of my invention is to be determined solely by the appended claims.

I claim:

1. In an airplane, a wing, an aileron, a flap, means to operate the aileron and flap, and additional means automatically operating in response to operation of the flap to prevent operation of the aileron when the flap is in its inoperative position.

2. In an airplane, a wing, an aileron, said aileron being adapted to be moved upwardly from a first position to a second position above the upper surface of the wing, means for moving the aileron as aforesaid, a flap, control means for said aileron and flap so constructed and arranged that the aileron cannot be moved to a position above the wing until the flap is lowered, and means for lowering the flap.

3. In an airplane, a wing, a recess in the wing, an aileron adapted to be positioned within the recess without the airflow over the wing, means for moving the aileron from the recess, a flap, means to lower and raise the flap, and control means for said aileron moving means operable in response to raising the flap to prevent the aileron from being moved from the recess so long as the flap is in its upper position.

4. In an airplane, a wing, a recess adjacent the upper trailing edge of the wing, an aileron adapted to be positioned within the recess without the airflow over the wing, means to move the aileron from the recess, a flap mounted at the lower trailing edge of the wing, means to lower and raise said flap, and means controlling operation of said aileron moving means as a function of flap movement to prevent the aileron from being moved from the recess to a point within the airflow over the wing as long as the flap is in its upper position.

5. In an airplane, a wing, an aileron adjacent the trailing edge of the wing, said aileron being adapted to move upwardly from a first position to a second position above the upper surface of the wing, means for moving the aileron as aforesaid, a flap adjacent the lower trailing edge of the wing, control means for said aileron and flap so constructed and arranged that the aileron cannot be moved to a position above the wing until the flap is lowered, and means for lowering the flap.

6. In an airplane, a wing, an aileron for the trailing edge of the wing, a flap for the lower trailing edge of the wing, a spoiler for the wing, means to operate the aileron, flap and spoiler, and additional means controlled by operation of the flap to prevent operation of the aileron when the flap is in its inoperative position.

7. In an airplane having a wing, an aileron and a flap operably associated with the wing, means for displacing the flap from an inoperative position to an operative position thereof, means for adjusting the aileron independently of displacement of the flap, and control means for said aileron adjusting means, said control means comprising a control element operable in response to displacement of the flap such that displacement of the flap from its operative position to its inoperative position causes the control means to prevent adjustment of the aileron by said aileron adjusting means.

8. In an airplane, a wing having a recess, an aileron in said recess, means for mounting the aileron to accommodate displacement of the aileron from said recess to an operative position thereof out of said recess and from its operative position to said recess, means for displacing the aileron as aforesaid, a flap, means for mounting the flap to accommodate swinging thereof downwardly from said wing from an inoperative position to an operative position thereof, means for swinging the flap as aforesaid, and control means for said aileron displacing means operable in response to swinging of the flap such that said aileron displacing means is rendered inoperative to displace the aileron to its operative position in response to swinging of the flap from its operative position to its inoperative position.

9. In an airplane, a wing having a recess, an aileron in said recess, means for mounting the aileron to accommodate displacement of the aileron from said recess to an operative position thereof out of said recess and from its operative position to said recess, means for displacing the aileron as aforesaid, a flap, means for mounting the flap to accommodate swinging thereof downwardly from said wing from an inoperative position to an operative position thereof, means for swinging the flap as aforesaid, and control means for said aileron displacing means operable in response to swinging of the flap such that said aileron displacing means operates to displace the aileron from said recess in response to downward swinging of the flap and to displace the aileron to said recess in response to upward swinging of the flap back to its inoperative position, said control means preventing displacement of the aileron from said recess as long as the flap is in its inoperative position.

10. In an airplane, a wing, an aileron adapted for movement relative to the wing, means for moving the aileron, a flap adapted for movement relative to the wing from an inoperative position to a position of operation, a spoiler adapted for movement relative to the wing, means for moving the spoiler, a manually operable control device, a clutch operable to connect the control device selectively with the aileron moving means and with the spoiler moving means, fluid actuated means for operating the clutch, and means for controlling the operation of the fluid actuated means by movement of the flap such that as long as the flap is in its inoperative position the clutch connects the control device with the spoiler moving means and when the flap is moved to its operative position the clutch disconnects the control device from the spoiler moving means and connects the control device with the aileron moving means.

11. In an airplane, a wing having a recess, an aileron positioned within the recess without the airflow over the upper surface of the wing and adapted for movement from the recess to an operative position thereof within the airflow, means for adjusting the aileron when the latter is moved to its said operative position, a flap adapted for lowering movement relative to the wing from an inoperative position to a position of operation, means for lowering the flap as aforesaid, a spoiler adapted for movement relative to the wing, means for moving the spoiler, a manually operable control device, a clutch operable to connect the control device selectively with the aileron adjusting means and with the spoiler moving means, fluid actuated means for operating the clutch and for moving the aileron to its said operative position, and means for controlling the operation of the fluid actuated means by movement of the flap such that when the flap is lowered the fluid actuated means operates to move the aileron to its said operative position and also operates the clutch to disconnect the control device from the spoiler moving means and to connect the control device with the aileron adjusting means.

12. In an airplane, a wing having a recess, an aileron positioned within the recess without the airflow over the upper surface of the wing and adapted for movement from the recess to an operative position thereof within the airflow, means for pivotally mounting the aileron on the wing to accommodate movement of the aileron as aforesaid, means for adjusting the aileron when the latter is moved to its said operative position, a flap adapted for lowering movement relative to the wing from an inoperative position to a position of operation, means for lowering the flap as aforesaid, a spoiler adapted for movement relative to the wing, means for moving the spoiler, a manually operable control device, a clutch operable to connect the control device selectively with the aileron adjusting means and with the spoiler moving means, fluid actuated means for operating the clutch and for moving the aileron to its said operative position, and means for controlling the operation of the fluid actuated means by movement of the flap such that when the flap is lowered the fluid actuated means operates to move the aileron to its said operative position and also operates the clutch to disconnect the control device from the spoiler moving means and to connect the control device with the aileron adjusting means.

13. In an airplane, a wing having a recess, an aileron positioned within the recess without the airflow over the upper surface of the wing and adapted for movement from the recess to an operative position thereof within the airflow, a support for the aileron extending in a direction generally transversely of the wing, means for mounting the support on the wing for movement of the support in said direction to dispose the aileron in said operative position, means for adjusting the aileron when the latter is moved to its said operative position, a flap adapted for lowering movement relative to the wing from an inoperative position to a position of operation, means for lowering the flap as aforesaid, a spoiler adapted for movement relative to the wing, means for moving the spoiler, a manually operable control device, a clutch operable to connect the control device selectively with the aileron adjusting means and with the spoiler moving means, power operating means for operating the clutch and for moving said support, and means for controlling the operation of the power operating means by movement of the flap such that when the flap is lowered the power operating means operates to move said support to dispose the aileron in its said operative position and to operate the clutch to disconnect the control device from the spoiler moving means and to connect the control device with the aileron adjusting means.

14. In an airplane, a wing having a recess, an aileron positioned within the recess without the airflow over the upper surface of the wing and adapted for movement from the recess to an operative position thereof within the airflow, a support for the aileron extending in a direction generally transversely of the wing, means for mounting the support on the wing for movement of the support in said direction to dispose the aileron in said operative position, a flap adapted for lowering movement relative to the wing from an inoperative position to a position of operation, means for lowering the flap as aforesaid, a spoiler adapted for movement relative to the wing, means for moving the spoiler, a manually operable control device, a clutch operable to connect the control device selectively with the aileron adjusting means and with the spoiler moving means, fluid actuated means for operating the clutch and for moving said support, and means for controlling the operation of the fluid actuated means by movement of the flap such that when the flap is lowered the fluid actuated means operates to move said support to dispose the aileron in its said operative position and to operate the clutch to disconnect the control device from the spoiler moving means and to connect the control device with the aileron adjusting means.

15. In an airplane, a wing, an aileron adapted to be adjusted, a flap adapted for raising and lowering movement with respect to the wing, a spoiler adapted to be adjusted, a control stick adapted for operation by the airplane pilot to adjust the spoiler and aileron, a clutch operable to operably connect the control stick selectively with the aileron and spoiler, and means controlled by movement of the flap for operating the clutch such that the clutch operably connects the control stick with the spoiler as long as the flap is in its raised position and such that the clutch is operated to disconnect the control stick from the spoiler and connect the control stick with the aileron by lowering the flap.

16. In an airplane, a wing, an aileron adapted to be adjusted, a flap adapted for raising and lowering movement with respect to the wing, a spoiler adapted to be adjusted, a control stick adapted for operation by the airplane pilot to adjust the spoiler and aileron, a clutch operable to operably connect the control stick selectively with the aileron and spoiler, and electrically actuated means controlled by movement of the flap for operating the clutch such that the clutch operably connects the control stick with the spoiler as long as the flap is in its raised position and such that the clutch is operated to disconnect the control stick from the spoiler and connect the control stick with the aileron by lowering the flap.

17. In an airplane, a wing having a recess, an aileron positioned within the recess without the airflow over the upper surface of the wing and adapted for movement from the recess to an operative position thereof within the airflow, means for adjusting the aileron when the latter is moved to its said operative position, a flap adapted for lowering movement relative to the wing from an inoperative position to a position of operation, means for lowering the flap as aforesaid, a spoiler adapted for movement relative to the wing, means for moving the spoiler, a manually operable control device, a clutch operable to connect the control device selectively with the aileron adjusting means and with the spoiler moving means, electrically actuated means for operating the clutch and for moving the aileron to its said operative position, and means for controlling the operation of the electrically actuated means by movement of the flap such that when the flap is lowered the electrically actuated means operates to move the aileron to its said operative position and also operates the clutch to disconnect the control device from the spoiler moving means and to connect the control device with the aileron adjusting means.

18. In an airplane, a wing having a recess, an aileron positioned within the recess without the airflow over the upper surface of the wing and adapted for movement from the recess to an operative position thereof rearwardly of the trailing edge of the wing, support means for the aileron operable to move the aileron as aforesaid, means for adjusting the aileron when the latter is moved to its said operative position, a flap adapted for lowering movement relative to the wing from an inoperative position to a position of operation, means for lowering the flap as aforesaid, a spoiler adapted for adjustment relative to the wing, means for adjusting the spoiler, a manually operable control device, a clutch operable to connect the control device selectively with the aileron adjusting means and with the spoiler adjusting means, and means controlled by movement of the flap for operating the clutch and for operating the aileron support means such that as long as the flap is in its raised position the clutch operably connects the control device with the spoiler adjusting means and the aileron is disposed within said recess and such that by lowering the flap the clutch is operated to disconnect the control device from the spoiler adjusting means and connect the control device with the aileron adjusting means and the aileron support means is operated to move the aileron to its operative position.

19. In air airplane, a wing having a recess, an aileron positioned within the recess without the airflow over the upper surface of the wing and adapted for movement from the recess to an operative position thereof rearwardly of the trailing edge of the wing, support means for the aileron operable to move the aileron as aforesaid, means for adjusting the aileron when the latter is moved to its said operative position, a flap adapted for lowering movement relative to the wing from an inoperative position to a position of operation, means for lowering the flap are aforesaid, a spoiler adapted for adjustment relative to the wing, means for adjusting the spoiler, a manually operable control device, a clutch operable to connect the control device selectively with the aileron adjusting means and with the spoiler adjusting means, and fluid actuated means controlled by movement of the flap for operating the clutch and for operating the aileron support means such that as long as the flap is in its raised position the clutch operably connects the control device with the spoiler adjusting means and the aileron is disposed within said recess and such that by lowering the flap the clutch is operated to disconnect the control device from the spoiler adjusting means and connect the control device with the aileron adjusting means and the aileron support means is operated to move the aileron to its operative position.

20. In an airplane, a wing, an aileron adapted to be adjusted, a flap adapted for raising and lowering movement with respect to the wing, a spoiler adapted to be adjusted, a control stick adapted for operation by the airplane pilot to adjust the spoiler and aileron, a clutch operable to operably connect the control stick selectively with the aileron and spoiler, and means controlled by movement of the flap for operating the clutch.

TEMPLE N. JOYCE.